United States Patent
Horiuchi et al.

(10) Patent No.: US 9,903,243 B2
(45) Date of Patent: Feb. 27, 2018

(54) OIL SEPARATOR

(71) Applicant: TOYOTA BOSHOKU KABUSHIKI KAISHA, Aichi-ken (JP)

(72) Inventors: Yoji Horiuchi, Kariya (JP); Aoi Takano, Omihachiman (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 44 days.

(21) Appl. No.: 14/946,199

(22) Filed: Nov. 19, 2015

(65) Prior Publication Data
US 2016/0160716 A1 Jun. 9, 2016

(30) Foreign Application Priority Data

Dec. 5, 2014 (JP) .................................. 2014-247231

(51) Int. Cl.
| | |
|---|---|
| *B03C 3/36* | (2006.01) |
| *B01D 35/06* | (2006.01) |
| *B01D 53/32* | (2006.01) |
| *F01M 13/04* | (2006.01) |
| *B01D 46/00* | (2006.01) |
| *B01D 46/30* | (2006.01) |
| *B01D 46/50* | (2006.01) |
| *B03C 3/08* | (2006.01) |
| *B03C 3/155* | (2006.01) |

(Continued)

(52) U.S. Cl.
CPC ......... *F01M 13/04* (2013.01); *B01D 46/0032* (2013.01); *B01D 46/30* (2013.01); *B01D 46/50* (2013.01); *B03C 3/08* (2013.01); *B03C 3/155* (2013.01); *B03C 3/366* (2013.01); *B03C 3/41* (2013.01); *B03C 3/47* (2013.01); *B01D 53/323* (2013.01); *B03C 2201/30* (2013.01); *F01M 2013/0438* (2013.01); *F01M 2013/0466* (2013.01); *F01M 2013/0488* (2013.01)

(58) Field of Classification Search
CPC combination set(s) only.
See application file for complete search history.

(56) References Cited

U.S. PATENT DOCUMENTS 4,601,799 A * 7/1986 Froberger .............. B01D 35/06
                                                        204/562
4,627,406 A * 12/1986 Namiki .................. F01M 13/04
                                                        123/572

(Continued)

FOREIGN PATENT DOCUMENTS

DE     19642218 A1 * 4/1998  ............ F01M 13/04
JP     3-141811        6/1991

(Continued)

*Primary Examiner* — Frank Lawrence
*Assistant Examiner* — Sonji Turner
(74) *Attorney, Agent, or Firm* — Greenblum & Bernstein, P.L.C.

(57) ABSTRACT

An oil separator includes a case and introduces blow-by gas of an internal combustion engine into the case. The oil separator then separates oil from the blow-by gas and discharges the separated oil from the case. The case incorporates electrode plates, which are arranged at intervals and face each other. A filter is arranged between any adjacent two of the electrode plates. The filter is formed of fibers, which are made of an electrically insulating first material, or polyester. A potential difference is created between the electrode plates.

2 Claims, 2 Drawing Sheets

(51) Int. Cl.
*B03C 3/41* (2006.01)
*B03C 3/47* (2006.01)

(56) References Cited

U.S. PATENT DOCUMENTS

| | | | | |
|---|---|---|---|---|
| 4,718,923 | A * | 1/1988 | Haag | B03C 3/019 55/DIG. 38 |
| 5,041,145 | A * | 8/1991 | Kakinuma | B03C 3/38 55/DIG. 30 |
| 5,061,462 | A * | 10/1991 | Suzuki | B01D 53/32 123/536 |
| 5,066,316 | A * | 11/1991 | Ikeda | B01D 53/323 96/52 |
| 5,084,078 | A * | 1/1992 | Suzuki | B03C 3/70 60/275 |
| 8,789,517 | B2 * | 7/2014 | Narita | F01M 13/022 123/572 |
| 2006/0254264 | A1 * | 11/2006 | Takenaka | B03C 3/08 60/297 |
| 2008/0149082 | A1 * | 6/2008 | Heed | F01M 13/04 123/573 |
| 2008/0264251 | A1 * | 10/2008 | Szepessy | B01D 45/14 95/35 |
| 2011/0232362 | A1 * | 9/2011 | Thiagarajan | B01D 46/0086 73/23.33 |
| 2011/0283886 | A1 * | 11/2011 | Ladha | B01D 46/0068 95/278 |

FOREIGN PATENT DOCUMENTS

| | | | | |
|---|---|---|---|---|
| JP | 03141811 | A * | 6/1991 | ............. F01M 13/04 |
| JP | 09329015 | A * | 12/1997 | ........... F01N 3/0892 |

* cited by examiner

OIL SEPARATOR

BACKGROUND OF THE INVENTION

The present invention relates to an oil separator. The oil separator includes a case and introduces blow-by gas of an internal combustion engine into the case. The oil separator then separates oil from the blow-by gas and discharges the separated oil from the case.

Internal combustion engines are equipped with a recirculation passage for recirculating blow-by gas in the crank chamber to the intake passage. An oil separator is provided in such a recirculation passage to separate oil mist from the blow-by gas (for example, Japanese Laid-Open Patent Publication No. 3-141811).

The case of the oil separator disclosed in the above publication incorporates two meshed first and second electrodes, which are arranged to face each other. A power supply unit creates a potential difference between the first and second electrodes. In such an oil separator, water contained in blow-by gas is electrically charged when the blow-by gas flows through the first electrode, and the electrically charged water is adsorbed to the second electrode due to electrostatic force. At this time, oil mist contained in the blow-by gas is adsorbed to the second electrode together with the water. The publication states that oil mist contained in the blow-by gas is thus separated from the blow-by gas in this manner. The oil and water adsorbed to the second electrode drop due to the own weight and are discharged from the case through an oil outlet provided in the bottom wall of the case.

In the oil separator disclosed in the above mentioned publication, when the flow velocity of blow-by gas is great, oil is likely to flow through the second electrode without being adsorbed to the second electrode. The oil separator thus has a low oil capture efficiency.

In this respect, the meshes of the second electrode may be made smaller so that oil is easily adsorbed to the second electrode. In this case, however, the small meshes of the second electrode increases the airflow resistance, causing another problem. That is, the pressure loss by the oil separator increases.

SUMMARY OF THE INVENTION

Accordingly, it is an objective of the present invention to provide an oil separator that reliably improves the oil capture efficiency.

To achieve the foregoing objective, an oil separator including a case is provided. The oil separator is configured to introduce blow-by gas of an internal combustion engine into the case, separate oil from the blow-by gas, and discharge the separated oil from the case. The case includes electrode plates and a filter. The electrode plates are arranged in the case to face each other at intervals. A potential difference is created between the electrode plates. The filter is made of an electrically insulating first material and arranged between the electrode plates.

With the above configuration, the filter is arranged between the electrode plates. Thus, a potential difference created between the electrode plates generates an electric field between the electrode plates, and the surface of the filter is positively or negatively charged due to dielectric polarization. As a result, when electrically charged oil particles in the oil mist contained in the blow-by gas pass through between the electrode plates, the moving direction is bent by the electrostatic force, and the oil particles are captured by the filter.

When oil particles that are not electrically charged in the oil mist contained in the blow-by gas pass through the filter, the surfaces of those oil particles are positively or negatively charged due to dielectric polarization. As a result, the oil particles are drawn to the negative or positive charge on the filter surface due to electrostatic force and captured by the filter.

In this manner, the above described configuration allows a filter with large meshes to effectively capture oil contained in blow-by gas. This restricts the filter from increasing the airflow resistance. Therefore, the configuration increases the oil capture efficiency, while limiting increase in the pressure loss.

Since blow-by gas contains water vapor, the filter captures water vapor as well as oil. Thus, if the electrode plates are electrically connected to each other by the water captured by the filter, a great amount of electricity is consumed undesirably.

In this regard, since the above described configuration uses a filter made of an electrical insulating material, substantially no electricity flows through the filter itself. This restricts the electrode plates from being electrically connected to each other by the water captured by the filter. Accordingly, electricity consumption is prevented from being increased due to electrical connection between the electrode plates.

DETAILED DESCRIPTION OF THE PREFERRED EMBODIMENTS

<First Embodiment>

A first embodiment will now be described with reference to FIGS. 1 to 3.

Figure 1:
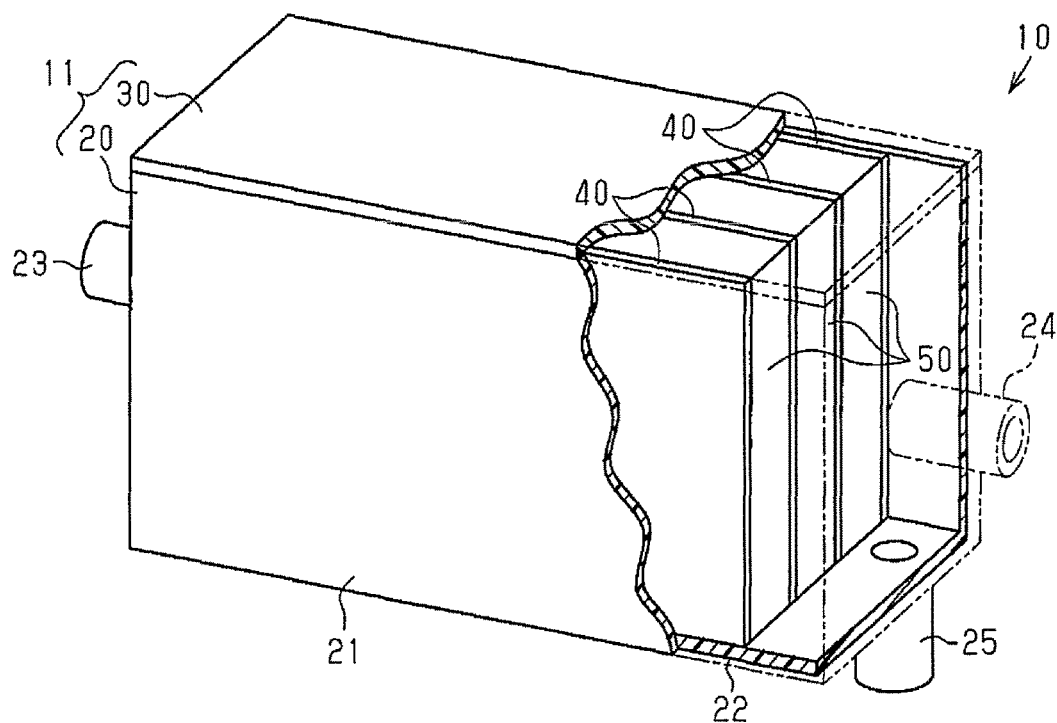
FIG. 1 is a perspective view of an oil separator according to a first embodiment.

An oil separator 10 shown in FIG. 1 is arranged in a recirculation passage, which recirculates blow-by gas in the crank chamber of an internal combustion engine to the intake passage. The oil separator 10 includes a case 11, which is made of an electrically insulating hard plastic such as Nylon 66.

The case 11 includes a case body 20 with an upper opening and a lid 30, which selectively opens and closes the upper opening of the case body 20. The case body 20 includes a bottom wall 22, which is rectangular when viewed from above, and a side wall 21 extending from the four sides of the bottom wall 22.

Figure 2:
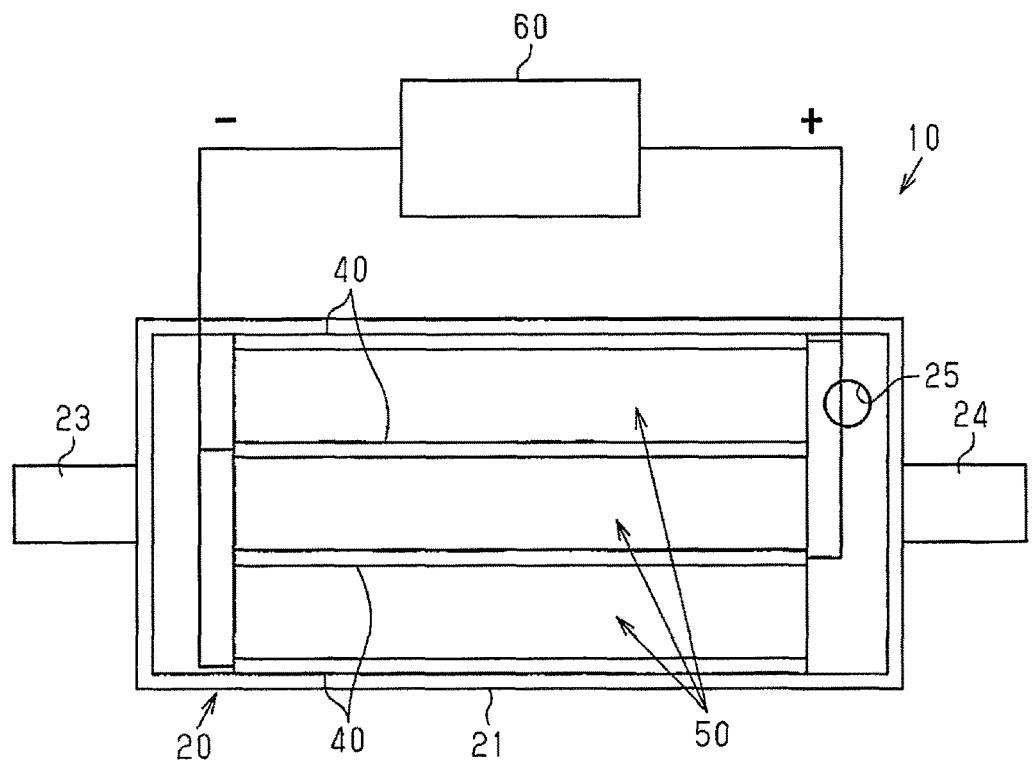
FIG. 2 is a plan view of the oil separator of FIG. 1 with the lid removed.

As shown in FIGS. 1 and 2, a cylindrical gas inlet 23 projects outward from a part of the side wall 21 that corresponds to a first end of the case body 20 in the longitudinal direction. Also, a cylindrical gas outlet 24 projects outward from a part of the side wall 21 that corresponds to a second end of the case body 20 in the longitudinal direction. An oil drain port 25 projects downward from a part of the bottom wall 22 that is close to the gas outlet 24.

The case body 20 incorporates four electrode plates 40 made of stainless steel. The electrode plates 40 are arranged to extend vertically and in the longitudinal direction, which agrees with the flowing direction of blow-by gas. Specifically, the electrode plates 40 are arranged to face each other at intervals and spaced from the first end and the second end of the side wall 21 in the longitudinal direction of the case body 20. The number of the electrode plates 40 may be changed to any number greater than one.

As shown in FIG. 2, a power supply unit 60 is connected to each electrode plate 40 via a conducting wire. The odd-numbered electrode plates 40 from the top in FIG. 2 are connected to the positive terminal (+) of the power supply unit 60, while the even-numbered electrode plates 40 from the top in FIG. 2 are connected to the negative terminal (−) of the power supply unit 60 or grounded. Thus, the power supply unit 60 creates a predetermined potential difference between any adjacent two of the four electrode plates 40. In FIG. 1, the power supply unit 60 is omitted.

A filter 50 made of fibers 51 (refer to FIG. 3) is arranged between any adjacent two electrode plates 40. The fibers 51 are made of an electrically insulating first material, which is polyester. Electrically insulating materials such as polyester are dielectric materials, in which dielectric polarization occurs. Each filter 50 is held in contact with adjacent two of the electrode plates 40. The vertical measurement and the longitudinal measurement of the filters 50 are set to be the same as the vertical measurement and the longitudinal measurement of the electrode plates 40, respectively. The position of the filters 50 in the longitudinal direction corresponds to the position of the electrode plates 40 in the longitudinal direction.

Operation of the present embodiment will now be described.

Blow-by gas that has been introduced into the case 11 through the gas inlet 23 moves toward the gas outlet 24.

In the oil separator 10, each filter 50 is arranged between adjacent two of the electrode plates 40. Thus, a potential difference between the electrode plates 40 generates an electrostatic field between the electrode plates 40 as shown in FIG. 3, and a positive (+) or negative (−) electric charge is generated on the surfaces of the fibers 51 of the filters 50 due to dielectric polarization. As a result, when electrically charged oil particles in the oil mist contained in the blow-by gas pass through between the electrode plates 40, the moving direction is bent by the electrostatic force, and the oil particles are captured by the filters 50.

Figure 3:
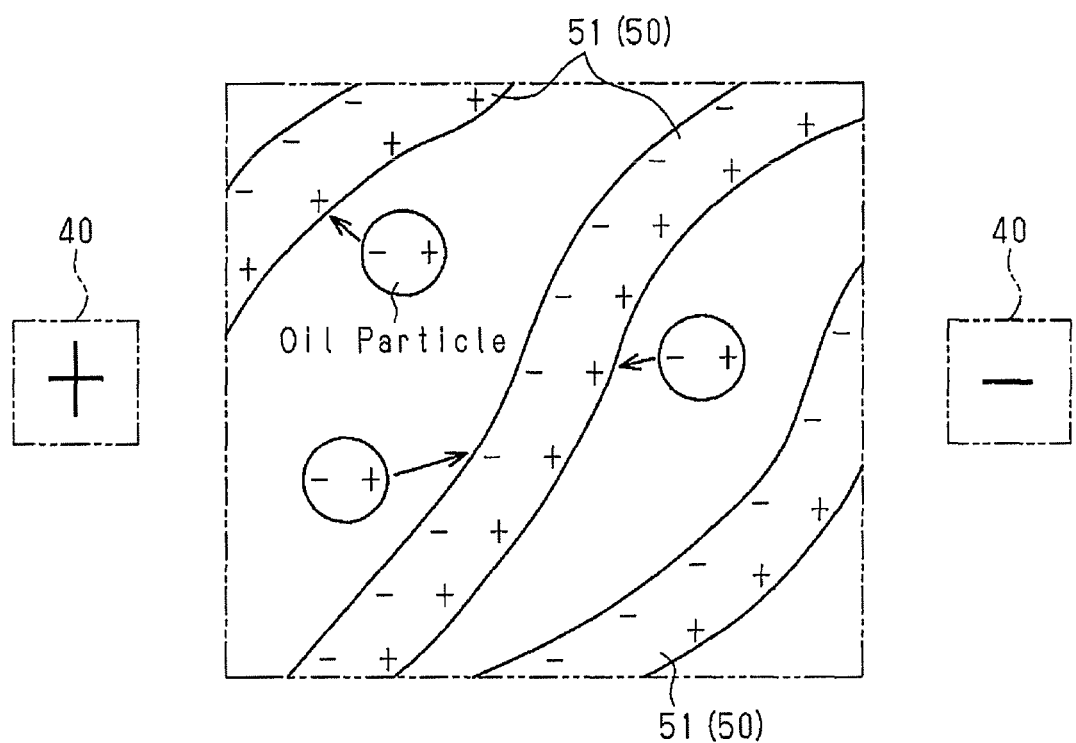
FIG. 3 is an explanatory diagram showing operation of the oil separator of FIG. 1.

When non-charged oil particles in the oil mist contained in the blow-by gas pass through the clearances between the fibers 51 of the filters 50 as shown in FIG. 3, the surfaces of the oil particles are positively charged (+) or negatively charged (−) due to dielectric polarization. Thus, the oil particles are drawn to the negative charge (−) or the positive charge (+) on the surfaces of the fibers 51 of the filters 50 due to electrostatic force and captured by the filters 50.

In this manner, the oil separator 10 of the present embodiment allows the filter 50 with large meshes to effectively capture oil contained in blow-by gas. This restricts the filter 50 from increasing the airflow resistance. This increases the oil capture efficiency, while limiting increase in the pressure loss.

Since the blow-by gas contains water vapor, the filters 50 capture water vapor as well as oil. Thus, if the electrode plates 40 are electrically connected to each other via the water captured by the filters 50, a great amount of electricity would be consumed wastefully.

In this regard, since the oil separator 10 of the present embodiment uses the filters 50 made of the electrical insulating fibers 51, substantially no electricity flows through the fibers 51. This restricts the electrode plates 40 from being electrically connected to each other via the water captured by the filters 50. Therefore, the configuration restricts electricity consumption due to electrical connection between the electrode plates 40 from being increased.

The blow-by gas, from which oil has been separated, flows out to the blow-by gas recirculation passage through the gas outlet 24, and the oil, which has been separated from the blow-by gas and collected on the bottom wall 22, moves along the bottom wall 22 and is then discharged from the case 11 through the oil drain port 25.

The oil separator 10 according to the above described embodiment has the following advantages.

(1) The case 11 of the oil separator 10 incorporates the electrode plates 40, which are arranged to face each other. A filter 50, which is made of the electrically insulating first material, is arranged between any adjacent two of the electrode plates 40. A potential difference is created between the electrode plates 40.

This configuration operates in the above described manner and reliably improves the oil capture efficiency. The configuration also restricts electricity consumption due to electrical connection between the electrode plates 40 from being increased.

<Second Embodiment>

A second embodiment will now be described.

The second embodiment is different from the first embodiment in that the surfaces of the fibers 51, which form the filters 50, are provided with a second material that has a higher electric resistivity than that of polyester (the first plastic), which is the base material of the fibers 51.

Polyfluoroethylene, which is a fluorine-containing material, is preferably used as the second material. The electric resistivity of polyfluoroethylene is from $1 \times 10^{16}$ to $1 \times 10^{17}$ Ω·m, while the electric resistivity of polyester is $1 \times 10^{14}$ Ω·m.

The oil separator according to the second embodiment has the following advantage.

(2) The surfaces of the fibers 51, which form the filters 50, are provided with polyfluoroethylene, which has a higher electric resistivity than that of polyester, which is the base material of the fibers 51.

This configuration improves the electric insulation of the filters 50 and further effectively restricts the electrode plates 40 from being electrically connected to each other via the water captured by the filters 50. The configuration therefore further effectively restricts electricity consumption due to electrical connection between the electrode plates 40 from being increased.

<Third Embodiment>

A third embodiment will now be described.

The third embodiment is different from the first embodiment in that the fibers 51 of the filters 50 contain a third material that has a higher relative permittivity than that of polyester (the first plastic), which is the base material of the fibers 51. Titanium oxide is preferably used as the third material. The relative permittivity of titanium oxide is approximately 83, while the relative permittivity of polyester is approximately 2.

The oil separator according to the third embodiment has the following advantage.

(3) The fibers 51, which form the filters 50, contain titanium oxide, which has a higher relative permittivity than that of polyester, which is the base material of the fibers 51.

This configuration readily causes dielectric polarization on the surfaces of the fibers 51, which form the filters 50. It is thus possible to lower the voltage to be applied between the electrode plates 40 to cause a predetermined dielectric polarization on the surfaces of the fibers 51. This restricts the electrode plates 40 from being electrically connected to each other. The configuration therefore further effectively restricts electricity consumption due to electrical connection between the electrode plates 40 from being increased.

<Fourth Embodiment>

A fourth embodiment will now be described.

The fibers 51 of the filters 50 according to the fourth embodiment contain barium titanate in addition to polyester, which is the base material of the fibers 51. The relative permittivity of barium titanate is approximately 5000.

The fourth embodiment has an advantage similar to the advantage (3) of the third embodiment.

The above described embodiments may be modified as follows.

The fibers 51, which form the filters 50, are not limited to the fibers made of polyester. For example, in place of polyester, any of polyethylene, polystyrene, and polytetrafluoroethylene, which have electric resistivity and relative permittivity equivalent to those of polyester, may be used.

The filters 50, which are formed by the fibers 51, may be replaced by other types of filters. For example, other types of filters may include porous filters. Porous filters made of polyurethane, for example, may be used.

The invention claimed is:

1. An oil separator comprising a case, wherein
the oil separator is configured to introduce blow-by gas of an internal combustion engine into the case, separate oil from the blow-by gas, and discharge the separated oil from the case, and
the case includes:
    electrode plates, which are arranged in the case to face each other at intervals, wherein a potential difference is created between the electrode plates; and
    a filter, which is made of an electrically insulating first material and arranged between the electrode plates,
wherein the first material is a first plastic, and
the filter is formed of fibers made of the first plastic, and
wherein a surface of each fiber is provided with a second material, which has a higher electric resistivity than that of the first plastic.

2. An oil separator comprising a case, wherein
the oil separator is configured to introduce blow-by gas of an internal combustion engine into the case, separate oil from the blow-by gas, and discharge the separated oil from the case, and
the case includes:
    electrode plates, which are arranged in the case to face each other at intervals, wherein a potential difference is created between the electrode plates; and
    a filter, which is made of an electrically insulating first material and arranged between the electrode plates,
wherein the first material is a first plastic, and
the filter is formed of fibers made of the first plastic, and
wherein each fiber contains a third material, which has a higher relative permittivity than that of the first plastic.

* * * * *